Jan. 31, 1933. J. W. BRUNDAGE 1,895,604
MOLDING PRESS
Filed Oct. 23, 1931
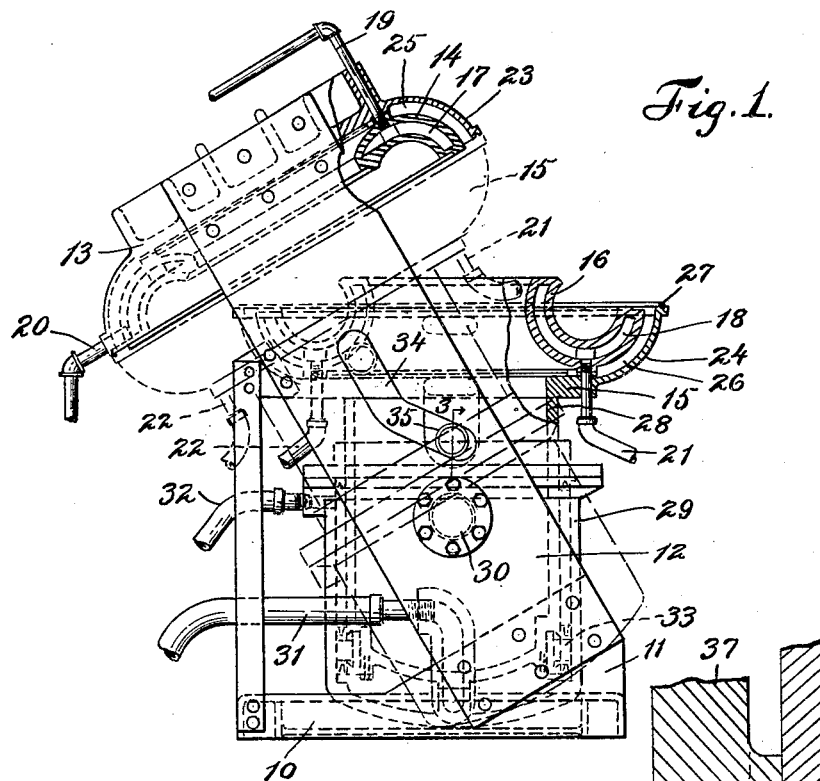
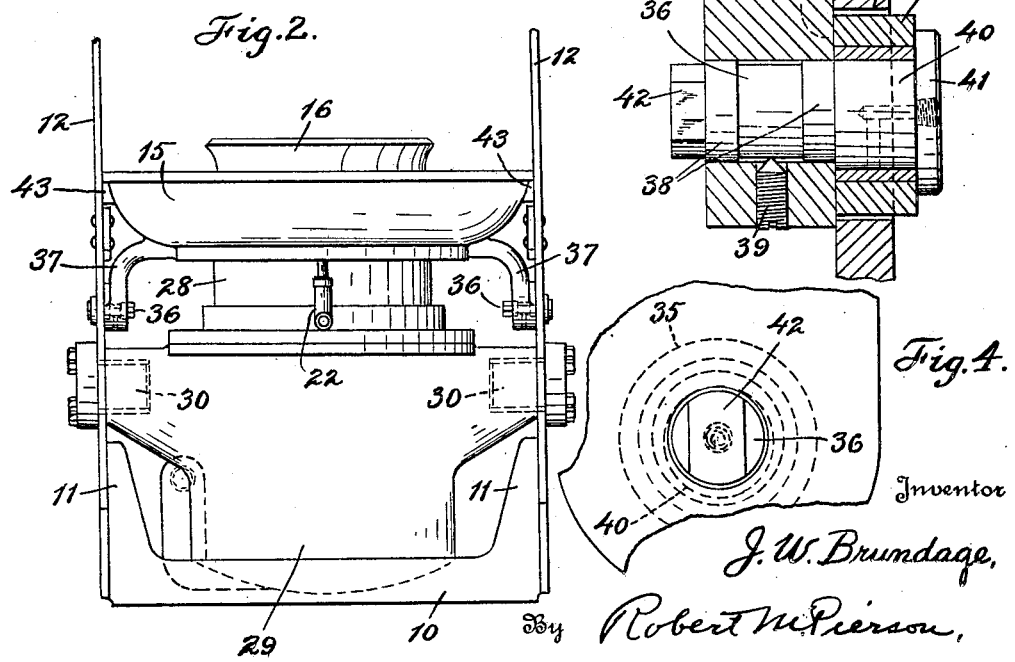
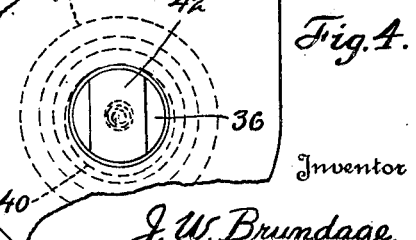
Inventor
J. W. Brundage,
By Robert M Pierson,
Attorney Patented Jan. 31, 1933

1,895,604

UNITED STATES PATENT OFFICE

JAMES WILLIAM BRUNDAGE, OF AKRON, OHIO, ASSIGNOR TO THE SUMMIT MOLD & MACHINE COMPANY, OF AKRON, OHIO, A CORPORATION OF OHIO

MOLDING PRESS

Application filed October 23, 1931. Serial No. 570,575.

This invention relates to presses for molding plastic materials, including vulcanizing presses for pneumatic tire casings and inner tubes. It further relates to a type of press wherein the platens which carry the respective mold sections are relatively movable in a straight line at right angles to their plane for opening and closing the mold, and are relatively displaceable laterally for exposing one of the mold sections in a convenient position for loading and unloading, as described in my prior application Serial No. 497,637 filed Nov. 24, 1930. The present invention is mainly an improvement upon the invention of said prior application.

Among the objects of my invention are, first to provide an improved adjustment for leveling or aligning one of the mold sections with respect to the other in order to obtain their accurate registration, secondly to obtain improved mold positioning and circulation of heating medium in one or more of the heating chambers of the mold, including better drainage of water of condensation from the steam-jackets during vulcanization, and thirdly to decrease the escape of heat from the mold jackets to the outer air in an improved manner.

Of the accompanying drawing, Fig. 1 is a side elevation, partly broken away and in section, showing a mold press embodying my present improvements in a preferred form.

Fig. 2 is a partial front elevation.

Fig. 3 is an enlarged detail section on the line 3 of Fig. 1, illustrating one of the cam roller adjustments.

Fig. 4 is an inner side elevation of the adjusting feature.

In the preferred arrangement herein illustrated and constituting one feature of my invention, the pivoted ram cylinder which forms a part of the press and whose piston or plunger carries the lower mold section is positioned to stand substantially vertical or upright when the mold is open, so that said lower mold section will be substantially horizontal when in its unloading position, and the upper mold section is fixed in the press frame in a position backwardly inclined from the horizontal so that the article will be vulcanized in the closed mold in such backwardly inclined position or plane, to obtain advantages of circulation and drainage of the heating fluid or fluids. This arrangement further facilitates access to and inspection of the upper mold cavity and somewhat decreases the exposure of operators to the hot molds.

10 is a cast metal frame base having vertical webs 11 raised on the forward side portions thereof, to which are bolted or riveted the lower ends of a pair of backwardly tilted side plates 12, the latter having bolted or riveted between their upper ends the upper fixed press platen 13 which carries the backwardly inclined upper mold section 14, removably secured to the platen by suitable fastenings. The inclination in this case is approximately 30 degrees from the horizontal, but it may be varied more or less.

15 is an annular lower press platen having the lower mold section 16 removably secured thereto. The mold sections are double walled to provide steam jacket chambers 17, 18, and the mold cavity in this case is shaped to form an inner tube, but might be adapted for the molding of a tire casing or other article. Fixed steam-supply and discharge pipes 19, 20 connect respectively with the highest and lowest points of the upper mold section, and the water of condensation drains readily through the discharge pipe 20 by reason of the inclined position of the mold section so as to avoid uneven heating of the article during vulcanization due to differences of temperature in different parts of the mold. Other steam-supply and discharge pipes 21, 22 connect with corresponding portions of the lower mold section 16 to provide the same kind of circulation and drainage when said lower section is in its backwardly inclined vulcanizing position in registry with the upper mold section, as indicated by the broken line position for the lower press platen 15.

The described backward inclination of the mold during the vulcanizing operation may also be employed in some cases to promote the proper internal heating of a tire casing which is expanded by hot water under pressure contained in a flexible bag within the article or directly injected into the article, according to familiar practices, in that it allows for supplying the hot water to the lowest part of the inner periphery of the bag and its removal from the opposite side or highest part of said inner periphery in order to maintain an approximately uniform internal temperature throughout the article.

A further feature of my present improvements consists in forming the respective upper and lower platens 13 and 15 with bowl-shaped walls, flanges or shell portions 23, 24 spaced from the outer jacket walls of the mold sections to provide portions 25, 26 of a closed air space which surrounds the outer periphery of the mold when the latter is closed, in order to reduce the escape of heat from said jacket walls. One of said shell portions, as the lower one, may have a soft packing ring 27 for engaging the edge of the other shell portion to seal this insulating space, and I find that the rectilinear movement imparted to the lower platen as hereinafter described, in order to close the mold, facilitates the simultaneous registering of the mold sections and closing of the insulating space in a proper manner. A similarly-acting but larger insulating air space is enclosed by the inner periphery of the mold and by the upper and lower platens when the latter and the mold sections are closed together.

The annular lower press platen 15 is formed at the upper end of a hollow ram or plunger 28 which works within, and through the packed upper head of, a cylinder 29 pivoted to turn on horizontal journals 30 which are removably fixed upon the side frame plates 12. 31 is a pipe connected with the lower end of cylinder 29 for supplying hydraulic pressure to said lower end to raise the plunger in the cylinder and for discharging said pressure, said pipe being connected with a suitable valve mechanism to control the supply and discharge. For breaking open the mold, the weight of the plunger and its attached parts is effective, and is preferably aided by a constant hydraulic pressure introduced into the upper end of the cylinder through a pipe 32, said pressure acting upon the narrow upper side of a piston portion 33 at the lower end of the plunger, and being effective when pressure is removed from the lower end of the cylinder, but overcome by said pressure acting on the larger area at the lower end of said plunger when the latter is being raised.

It will be understood that the pipes 21, 22, 31 and 32 are provided with flexible portions or with swing joints to accommodate the movements of the parts to which they are connected, as is usual in similar situations.

As in my aforesaid prior application, the desired rectilinear and angular movements of the ram and cylinder are imposed by a pair of fixed cam slots whose sides are engaged by rollers carried by the movable platen. One of said slots 34 is shown in Figs. 1 and 3, occupied by one of a pair of rollers 35 mounted on horizontal pins 36 which are carried by laterally and downwardly projecting arms 37 formed on the platen 15. Each of the cam slots has an upper rectilinear portion parallel with an axis at right angles to the plane of the upper mold section for guiding the lower mold section in a rectilinear path into registry with the upper section, and a lower inclined portion for producing an angular movement of the plunger and cylinder due to the longitudinal travel of the plunger. Thus, the mold is firmly and tightly closed simultaneously at all points throughout its periphery to avoid the extrusion of substantial rinds or overflow of rubber from the mold joints, and when the mold is opened, its lower section 15, which is formed to retain the vulcanized article therein, will be shifted laterally forward as indicated in Fig. 1 in a convenient position for loading and unloading, the longitudinal axis of the plunger and cylinder being then substantially vertical in the arrangement here shown, when the plunger has reached substantially its lowest position.

A further feature of my invention is designed to provide a simple adjustment for independently varying the angular position of the lower mold section in a fore-and-aft plane at the moment of closure in order to obtain an accurate registration thereof with the upper or fixed section. To this end each of the roller pins 36 is provided with journal portions 38 for support and turning movement of the pin in a complemental aperture of the arm 37, said portions being separated by a reduced neck engaged by the point of a pin-retaining set-screw 39, an eccentric cylindrical portion 40 on which the roller 35 turns, an outer roller-retaining head 41 and an inwardly-projecting portion 42 having parallel plane faces for receiving a wrench to turn the pin. Flat vertical slide faces, formed on the outer sides of the lower bosses of the arms 37 and on upper bosses 43 also provided on the movable platen 15, engage the frame plates 12 to maintain the joint faces of the said platen 15 and the lower mold section square with those of the upper platen and mold section along a transverse horizontal diameter when the mold parts come together, and the eccentric pins 36 provide a means for placing and maintaining the mold sections and platens in substantially exact parallelism along a fore-and-aft inclined diameter as viewed in Fig. 1 when they are brought together. To perform the adjustment, it is merely necessary to loosen the set-screw 39 for one or both of the pins 36, to turn said pin until its axis is laterally shifted the desired distance with respect to the center of the eccentric 40 and the upper rectilinear side portions of the cam slot 34, and then re-tighten the set-screw.

The form of embodiment may be variously modified without departing from the scope of my invention as defined in the claims.

I claim:

1. A molding press comprising a frame base provided with vertical forward side webs, a pair of rearwardly inclined side plates secured at their lower ends to said webs, an upper platen fixed between the upper ends of said side plates in a position rearwardly inclined from the horizontal, a ram cylinder pivoted to said side plates and having a plunger which carries a lower press platen, cam devices on said side plates, and cam-engaging members carried by said lower platen.

2. A molding press comprising a pair of platens having a relative rectilinear opening and closing movement and a relative angular movement into and out of line, heat-jacketed mold sections carried by the respective platens, shell portions on the respective platens having meeting edges and spaced from the mold sections to provide an insulating chamber surrounding the outer periphery of the mold, and a power device for imparting said relative movements.

3. A molding press comprising a pair of platens having a relative rectilinear opening and closing movement and a relative angular displacing movement, a power device acting on a movable one of said platens for imparting said relative movements, means for guiding said movable platen in parallelism with the other with respect to a transverse diameter, and means for adjusting said movable platen with respect to a longitudinal diameter at right angles to the first diameter to maintain the platens in parallelism along said longitudinal diameter.

4. A molding press comprising a pair of platens having a relative rectilinear opening and closing movement and a relative angular displacing movement, a frame carrying one of said platens and including a pair of side plates having cam slots provided with rectilinear and inclined portions, a ram device including a cylinder pivoted to said frame and a plunger carrying the other one of said platens, a pair of roller pins having means for fixing them in different angular adjustments on the plunger platen and provided with eccentric portions, and rollers mounted on said eccentric portions and occupying the cam slots.

5. A molding press comprising a mold composed of upper and lower steam-jacketed sections positioned to meet in a plane backwardly inclined from the horizontal, each of the jackets having a connection for supplying steam thereto at a relatively high level and another connection for discharging water of condensation from substantially its lowest point, a pivoted ram cylinder having a plunger carrying the lower mold section, and means whereby the movement of said plunger causes a rectilinear opening and closing movement of the lower mold section with reference to the upper one and a lateral tilting movement of the cylinder toward and from the vertical to carry the central axis of said lower section laterally into and out of line with that of the upper one.

In witness whereof I have hereunto set my hand this 22nd day of October, 1931.

JAMES WILLIAM BRUNDAGE.